US010565524B2

(12) United States Patent
Bellala et al.

(10) Patent No.: US 10,565,524 B2
(45) Date of Patent: *Feb. 18, 2020

(54) PERFORMING PRIVACY-PRESERVING MULTI-PARTY ANALYTICS ON HORIZONTALLY PARTITIONED LOCAL DATA

(71) Applicant: HEWLETT PACKARD ENTERPRISE DEVELOPMENT LP, Houston, TX (US)

(72) Inventors: Gowtham Bellala, Redwood City, CA (US); Shagufta Mehnaz, West Lafayette, IN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 451 days.

This patent is subject to a terminal disclaimer.

(21) Appl. No.: 15/421,144

(22) Filed: Jan. 31, 2017

(65) Prior Publication Data

US 2018/0218171 A1  Aug. 2, 2018

(51) Int. Cl.
G06F 21/60 (2013.01)
G06N 20/00 (2019.01)
G06F 21/62 (2013.01)

(52) U.S. Cl.
CPC .......... *G06N 20/00* (2019.01); *G06F 21/602* (2013.01); *G06F 21/6254* (2013.01)

(58) Field of Classification Search
CPC ............... G06F 21/602; G06F 21/6245; G06F 21/6254; G06N 20/00; G06N 99/005; H04L 9/14; H04L 9/30
See application file for complete search history.

(56) References Cited

U.S. PATENT DOCUMENTS 6,708,163 B1  3/2004 Kargupta et al.
7,836,090 B2 * 11/2010 Perrizo ................ G06K 9/6221
707/797

(Continued)

FOREIGN PATENT DOCUMENTS

WO  WO-2015131394  9/2015

OTHER PUBLICATIONS

Yu et al., "Privacy-preserving svm classification on vertically partitioned data", In Proceedings of the 10th Pacific-Asia conference on Advances in Knowledge Discovery and Data Mining, 2006, pp. 647-656.

(Continued)

*Primary Examiner* — Trang T Doan
(74) *Attorney, Agent, or Firm* — Hewlett Packard Enterprise Patent Department

(57) ABSTRACT

Examples disclosed herein relate to: computing, by a computing device at a party among a plurality of parties, a sum of local data owned by the party. The local data is horizontally partitioned into a plurality of data segments, with each data segment representing a non-overlapping subset of data entries owned by a particular party; computing a local gradient based on the horizontally partitioned local data; initializing each data segment; anonymizing aggregated local gradients received from the mediator, wherein the aggregated local gradients comprise gradients computed based on a plurality of data entries owned by the plurality of parties; receiving, from a mediator, a global gradient based on the aggregated local gradients; learning a global analytic model based on the global gradient; and performing privacy-preserving multi-party analytics on the horizontally partitioned local data based on the learned global analytic model.

18 Claims, 4 Drawing Sheets

(56) References Cited

U.S. PATENT DOCUMENTS

| | | | | |
|---|---|---|---|---|
| 8,249,250 | B2 | 8/2012 | Rane et al. | |
| 8,893,292 | B2 | 11/2014 | Wang et al. | |
| 9,548,861 | B2* | 1/2017 | Isshiki | H04L 9/3073 |
| 9,961,141 | B1* | 5/2018 | Allard | H04L 67/1095 |
| 9,998,539 | B1* | 6/2018 | Brock | G06F 11/1076 |
| 2005/0021488 | A1* | 1/2005 | Agrawal | G06F 17/18 |
| 2010/0017870 | A1* | 1/2010 | Kargupta | H04L 63/1408 |
| | | | | 726/14 |
| 2012/0201378 | A1* | 8/2012 | Nabeel | H04L 9/008 |
| | | | | 380/255 |
| 2013/0047230 | A1* | 2/2013 | Krishnan | H04L 63/102 |
| | | | | 726/7 |
| 2016/0154999 | A1* | 6/2016 | Fan | G06K 9/00201 |
| | | | | 382/103 |
| 2016/0306854 | A1* | 10/2016 | Hegde | G06F 16/22 |
| 2017/0103116 | A1* | 4/2017 | Hu | G06F 16/213 |
| 2017/0116520 | A1* | 4/2017 | Min | G06N 3/08 |

OTHER PUBLICATIONS

Vaidya et al., "Privacy-preserving decision trees over vertically partitioned data", ACM Transactions on Knowledge Discovery from Data (TKDD), vol. 2, No. 3, 2008, Article 14, 27 pages.

Vaidya et al., "Privacy preserving association rule mining in vertically partitioned data", In Proceedings of the 8th ACM SIGKDD International conference on Knowledge Discovery and Data Mining, 2002, pp. 639-644.

Popa et al., "Cryptdb: Protecting confidentiality with encrypted query processing", In Proceedings of the 23rd ACM Symposium on Operating Systems Principles (SOSP), 2011, pp. 85-100.

Paul Ohm, "Broken promises of privacy: Responding to the surprising failure of anonymization", UCLA Law Review, 2010, pp. 1701-1777.

Omer et al., "Privacy Preserving in Distributed SVM Data Mining on Vertical Partitioned Data" 2016 3rd International Conference onSoft Computing & Machine Intelligence (Year: 2016).

Narayanan et al., "Robust de-anonymization of large sparse datasets", In Proceedings of the 2008 IEEE Symposium on Security and Privacy, 2008, pp. 111-125.

Narayanan et al., "Privacy and security: Myths and fallacies of personally identifiable information", ACM Communications, vol. 53, Issue 8, 2010, pp. 24-26.

Narayanan et al., "De-anonymizing social networks", In Proceedings of the 2009 IEEE Symposium on Security and Privacy, 2009, pp. 173-187.

Mangasarian et al., "Privacy-preserving classification of vertically partitioned data via random kernels", ACM Transactions on Knowledge Discovery from Data (TKDD), vol. 2, Issue 3, 2008, Article No. 12.

Liu et al., "A survey of attack techniques on privacy-preserving data perturbation methods", Privacy-Preserving Data Mining, vol. 34, No. 1, 2008, pp. 359-381.

Lindell et al., "Secure multiparty computation for privacy-preserving data mining", Journal of Privacy and Confidentiality, vol. 1, No. 1, 2009, 39 pages.

Kargupta et al., "On the privacy preserving properties of random data perturbation techniques", In ICDM, 2003, available online at <https://www.eecs.wsu.edu/~siva/icdm03.pdf>, 8 pages.

Jeff Goldman, "Third-Party Vendors a Weak Link in Security Chain", eSecurityPlanet, available online at <https://www.esecurityplanet.com/network-security/third-party-vendors-a-weak-link-in-security-chain.html>, Mar. 6, 2015, 8 pages.

J. Vaidya. Privacy preserving data mining over vertically partitioned data. PhD thesis, Purdue University, 2004, 162 pages.

Huang et al., "Deriving private information from randomized data", SIGMOD '05 Proceedings of the 2005 ACM SIGMOD international conference on Management of data, 2005, pp. 37-48.

Gentry et al., "A fully homomorphic encryption scheme", PhD thesis, Stanford University, 2009, available online at <https://crypto.stanford.edu/craig/craig-thesis.pdf>, 209 pages.

Aggarwal et al., "A general survey of privacy-preserving data mining models and algorithms", Springer, 2008, pp. 11-52.

Amirbekyan, A. et al; The privacy of k-NN retrieval for horizontal partitioned data—new methods and applications; http://crpit.com/confpapers/CRPITV63Amirbekyan.pdf; 2015; 10 pages.

Banerjee, et al; A generic and distributed privacy preserving classification method with a worst-case privacy guarantee; http://userpages.umbc.edu/~zhchen/papers/generic.pdf; May 1, 2013; 31 Pages.

Biswas; A.S.et al; Privacy Preserving K-means Clustering; https://courses.csail.mit.edu/6.857/2016/files/8.pdf; May 11, 2016; 10 pages.

Gascon, et al; Secure Linear Regression on Vertically Partitioned Datasets; https://eprint.iacr.org/2016/892.pdf ; Retrieved Jan. 20, 2017; 27 pages.

Gupta, M. ; An Enhanced CART Algorithm for Preserving Privacy of Distributed Data and Provide ; http://www.ijritcc.org/download/1450765532_22-12-2015.pdf ; International Journal on Recent and Innovation Trends in Computing and Communication ISSN: 2321-8169 vol. 3 Issue: 12; Dec. 2015; 5 pages.

Murdopo, A. et al ; Distributed Decision Tree Learning for Mining Big Data Streams; http://people.ac.upc.edu/leandro/emdc/arinto-emdc-thesis.pdf; Jul. 2013; 75 pages.

Prakash, et al; Privacy Preserving Data Mining Using Secure Multiparty Computation; http://ijcsiet.com/pdf/01092013-006.pdf ; 2008, retrieved Jan. 20, 2017; 5 pages.

Viadya, J. et al ; Leveraging the "Multi" in Secure Multi-Party Computation; https://pdfs.semanticscholar.org/eafd/157850c5b45d2cb124bea2d44c1fbb8ab0d3.pdf; Oct. 30, 2003; 7 pages.

Yigzaw, K.Y. et al; Secure and Scalable Deduplication of Horizontally Partitioned Health Data for Privacy-preserving Distributed Statistical Computation; http://westminsterresearch.wmin.ac.uk/18150/1/2016-BMC%20-%20Secure_Scalable_Deduplication.pdf;2017; 19 pages.

\* cited by examiner

PERFORMING PRIVACY-PRESERVING MULTI-PARTY ANALYTICS ON HORIZONTALLY PARTITIONED LOCAL DATA

BACKGROUND

Sometimes, multiple parties, each owning some data, want to collaborate with each other while preserving the privacy of their own data in the meantime. The data may be horizontally partitioned across the multiple parties. That means that each party owns all attributes (or columns) for a set of data entries (or rows). As an example, consider a healthcare scenario where multiple hospitals are willing to collaborate. Each hospital may have complete data about its patients. In order to run analytics on multi-party data in a privacy preserving manner, various protocols are used as building blocks in data mining. Conventional solutions either target a particular analytical task and thus cannot be applied to generic analytical tasks, or assume two parties when applicable to generic analytical tasks with increased computational complexity when the number of parties is more than two. Hence, it is difficult to scale these conventional solutions to big data analytics and generic analytical tasks, especially when more than two parties participate in the communications.

BRIEF DESCRIPTION OF THE DRAWINGS

The following detailed description references the drawings, wherein.

DETAILED DESCRIPTION

Figure 1A:
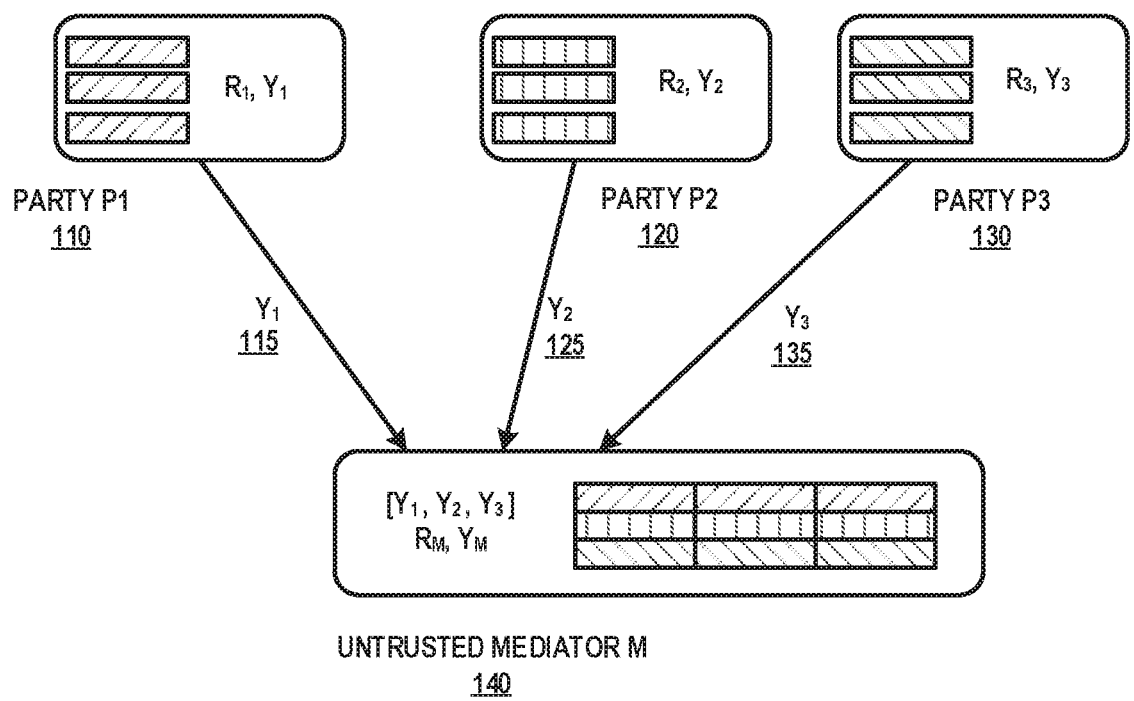
FIGS. 1A-1B are block diagrams of an example threat model and secure protocol used by multiple parties and a non-trusted mediator to perform privacy-preserving multi-party analytics on horizontally partitioned local data.

In the following description, details are presented to provide a detailed description. Concepts and techniques disclosed herein can be practiced without one or more of the specific details, or in combination with other components, etc. As used herein, the term "implementation" generally refers to an implementation that serves to illustrate by way of example but not limitation. It should be understood that this disclosure covers all modifications, equivalents, and alternatives falling within the spirit and scope of the present disclosure.

One challenge in data-driven enterprises is how to extract information from a dataset that can facilitate good business decisions, without sacrificing the privacy of the individuals or organizations whose sensitive details may be contained in the dataset. This challenge is compounded when the analysis involves multiple parties (or organizations) which want to collaborate with each other in order to obtain a broader understanding of a topic of mutual interest.

For example, a group of hospitals may want to work together to improve their collective quality of healthcare. Each hospital may have collected a lot of data about its own patients, including their demographics, past medical history, lab results, current diagnosis, prescribed treatment and outcomes, etc. This data contains a lot of information that, if shared across the group, could mutually benefit parties in the group, allowing faster diagnosis and effective treatment for similar cases. However, this data also contains sensitive and private information both about the patients and about the hospitals. Thus, sharing this sort of data can be difficult due to privacy and regulatory reasons.

In general, this class of scenarios arises when a dataset containing private information belongs to multiple parties, and the parties collectively want to perform analytics on the entire dataset while respecting the privacy and security concerns of each individual party. For example, multiple hospitals may want to perform analysis on patients diagnosed with a specific type of cancer. Each hospital may have a limited number of patients that are diagnosed with the specific type of cancer. Thus, it would be beneficial if multiple hospitals can collaborate with each other, and perform analysis on all patients diagnosed with the specific type of cancer treated at all hospitals. This scenario may occur in a variety of applications ranging from healthcare to the Internet-of-things (IoT).

Existing solutions often either target a particular analytical task and thus cannot be applied to generic analytical tasks, or assume two parties when applicable to generic analytical tasks with increased computational complexity when the number of parties is more than two. Hence, it is difficult to scale these conventional solutions to big data analytics and generic analytical tasks, especially when more than two parties participate in the communications. The solution disclosed herein can be used on real world datasets for a variety of analytical use cases. Two example analytical use cases, e.g., linear regression and binary classification, are explained in details.

The solution described herein generally applies to a setting where there are multiple parties, for example, more than two parties, that are willing to collaborate and the data is horizontally partitioned across the multiple parties. This means each party owns all attributes (or columns) for a set of data entries (rows). For example, consider a healthcare scenario where multiple hospitals are willing to collaborate. Each hospital has complete data about its patients. Table 1 below shows an example of horizontally partitioned data between two parties.

TABLE 1

| Heart rate ($x_1$) | Calcium score ($x_2$) | Length of hospital stay (y) |
|---|---|---|
| 78 | 408 | 20 |
| 72 | 159 | 8 |
| 89 | 211 | 13 |
| 77 | 190 | 9 |

In the example illustrated in Table 1, the first two data entries (e.g., the first and second rows) are proprietary patient data owned by a first hospital; and, the next two data entries (e.g., the third and fourth rows) are proprietary patient data owned by a second hospital. Note that both the data set from the first hospital and the data set from the second hospital include identical columns. Also, both data sets have non-overlapping data entries, because a patient cannot be admitted to two hospitals at the same time. Therefore, the combined data set is referred to as being horizontally partitioned. Each partition of the combined data set corresponds to a subset of data entries owned by a particular party, whereas the subset of data entries share the same columns as other data entries owned by other parties but does not have any overlapping data rows.

Figure 1B:
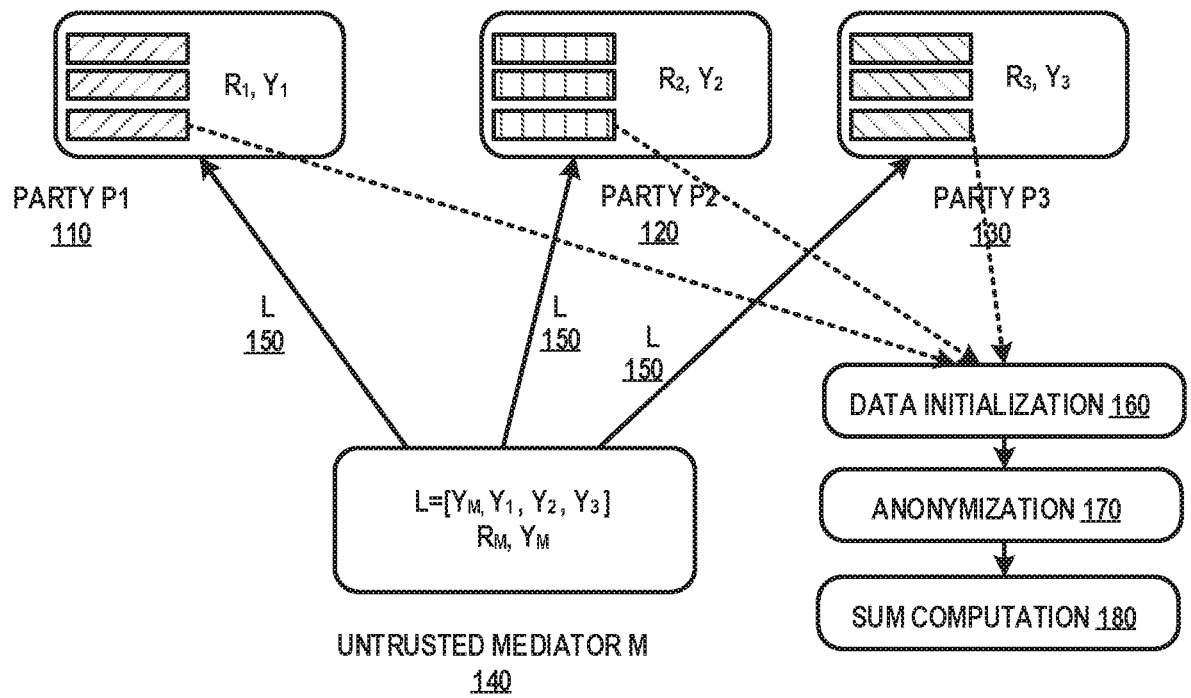

FIGS. 1A-1B are block diagrams of an example threat model and secure protocol used by multiple parties and a non-trusted mediator to perform privacy-preserving multi-party analytics on horizontally partitioned local data. In this example, the threat model involves an honest but curious (e.g., semi-honest) adversary model rather than a malicious model. Under the malicious threat model, parties may commit malicious acts, for example, sending incorrect information when collecting with other parties. By contrast, under the honest but curious mode, a party can follow the protocol without malicious behaviors, but may try to acquire as much information as possible about other parties' private data during the computation. Thus, it is possible for a party to commit non-malicious attacks, such as, collusion attacks.

The collusion-resistant data anonymization may be achieved by randomly permuting the data (or segments of the data) submitted by the multiple parties. This anonymization provides that the mediator along with the colluding semi-honest parties cannot breach an honest party's data anonymity as long as the adversary has control over at most (N−2) parties.

FIGS. 1A-1B include a non-trusted mediator 140 and multiple parties, such as, party P1 110, party P2 120, and party P3 130. In this example, each party (P1 110, P2 120, or P3 130) has its own private data, e.g., a value that may be a vector including multiple dimensions. The goal of the computation is to seek a sum of the values from the three parties P1 110, P2 120, and P3 130.

First, each party P1 110, P2 120, P3 130 and the non-trusted mediator M 140 generates a pair of keys, including a public key Y and a private key R. Each party may share its public keys with the non-trusted mediator M 140 and other parties, but may store its private key such that the private key is only known to the party creating the key. As illustrated in FIG. 1A, P1 110 generates a public key $Y_1$ and a private key $R_1$; P2 120 generates a public key $Y_2$ and a private key $R_2$; and, P3 130 generates a public key $Y_3$ and a private key $R_3$. Furthermore, P1 110, P2 120, and P3 130 may share with non-trusted mediator M 140 their respective public key $Y_1$ 115, $Y_2$ 125, and $Y_3$ 135.

Similarly, non-trusted mediator M 140 also creates a private key $R_M$ and a public key $Y_M$. Also, non-trusted mediator M 140 may store the private key $R_M$ in a place accessible only to itself. After receiving the public keys from the parties participating in the collaboration, non-trusted mediator M 140 can generate a collection of public keys L=[$Y_M$, $Y_1$, $Y_2$, $Y_3$] 150, and can share L with each participating party (e.g., parties P1 110, P2 120, and P3 130).

Under a secure sum protocol, each party P1 110, P2 120 and P3 130 divides its own data (e.g., a value) into multiple data segments, which are represented by the shaded blocks in FIGS. 1A-1B. The segmented data may be encrypted using at least one public key from L 150 before being shared with other parties and/or non-trusted mediator M 140. Under the protocol described herein, parties generally do not transmit data to another party (P1 110, P2 120, or P3 130) or non-trusted mediator M 140 without any encryption. Data from each party may generally go through three distinct phases under the secure protocol that involves at least data initialization 160, anonymization 170, and sum computation 180.

In the data initialization phase 160, each party can prepare its data for submission to the non-trusted mediator. This phase includes at least two operations: The first operation involves sharding the data into a number of segments. The second operation involves recursively encrypting the data segments with the public keys of mediator M 140 and the multiple parties (assuming N parties).

In the anonymization phase 170, the mediator M 140 sends the set of prepared data to the Nth party (e.g., party P3 130). Here, the Nth party indicates the party to which the last shared public key belongs to. Then, the Nth party can perform decryption, then shuffle on the prepared data set and send randomly shuffled data to the (N−1)th party (e.g., party P2 120). The (N−1)th party can then further decrypt and shuffle the data segments, and this process continues until the data is decrypted and shuffled by the 1st party (e.g., party P1 110). Finally, the mediator M 140 receives anonymized data from the 1st party (e.g., P1 110) with only one layer of encryption using the mediator M 140's public key.

As used herein, "shuffling on the prepared data set" generally involves randomly rearranging the order of data segments within the prepared data set. As used herein, "anonymizing data" generally refers to removing identifying attributes from the data, for example, by reordering and/or encrypting the data that were owned by multiple participating parties. As used herein, a "party" generally refers to a data entity as represented by at least one computing device hosting a private data set. As used herein, a "mediator" generally refers to a non-trusted entity as represented by at least one computing device with which each participating party is willing to share its data set in an encrypted form. Note that because the "mediator" here is a non-trusted entity, parties will not share their private data set with the mediator in plain text form.

In sum computation phase 180, the mediator M 140 can decrypt the data segments using its own secret key and computes the sum of the values from the N parties. Then, the mediator M 140 can share the sum with the N parties (e.g., P1 110, P2 120, and P3 130).

According to various examples, machine learning mechanisms can be transformed into an optimization solution with the goal of reducing a cost function as shown in Equation (1) below.

$$\min_{\theta_0,\theta_1,...,\theta_n} J(\theta_0, \theta_1, ..., \theta_n) \quad (1)$$

While some optimization solutions may have a closed form solution, most optimization solutions rely on a gradient descent technique, which may be more efficient than a closed form solution. As an example, a linear regression problem has a closed form solution that involves matrix inversion, which is a costly operation when the size of the dataset is large. Hence, the gradient descent technique may be used as an alternative to solve the linear regression problem.

Generally speaking, the gradient descent technique refers to a first-order iterative algorithm that searches for an optimal solution by iteratively taking steps in the direction of negative gradient in two steps as described below.

First, the gradient descent technique may initialize the model parameters $\{\theta_0, \theta_1, \ldots, \theta_n\}$. Second, until a termination criteria is satisfied, for each dimension of the model parameters j=1, 2, . . . , n, update model parameter $\theta_j$ as shown in Equation (2):

$$\theta_j^{(t+1)} = \theta_j^t - \alpha \frac{\partial}{\partial \theta_j} J(\theta_0, \theta_1, ..., \theta_n) \quad (2)$$

Each step in the gradient descent technique may involve updating the model parameters based on the current gradient value. The updating operation may be terminated upon convergence. The term α in Equation (2) can denote the learning rate, which tends to control the rate of convergence.

In machine learning mechanisms, the cost function J in Equation (1) and its partial derivative $$\frac{\partial J}{\partial \theta}$$

in Equation (2) can be estimated using the training data $\{X^{(i)}, y^{(i)}\}_{i=1}^{m}$ as shown in Equations (3) and (4):

$$J(\theta_0, \theta_1, \ldots, \theta_n) = \frac{1}{m}\sum_{i=1}^{N}\sum_{k=1}^{m_i} J(\theta_0, \theta_2, \ldots, \theta_n \mid \{X^{\{k\}}, y^{\{k\}}\}) \quad (3)$$

$$\frac{\partial}{\partial \theta_j} J(\theta_0, \theta_1, \ldots, \theta_n) = \quad (4)$$

$$\frac{1}{m}\sum_{i=1}^{N}\sum_{k=1}^{m_i} \frac{\partial}{\partial \theta_j} J(\theta_0, \theta_2, \ldots, \theta_n \mid \{X^{\{k\}}, y^{\{k\}}\})$$

In the following sections, two specific machine learning use cases are discussed to illustrate examples of how a particular analytical task may fit into the generalized framework disclosed herein. Note that, in each use case, the cost function and the update operation in the gradient descent technique involve a summation over the training data.

When analyzing data, regression generally may be used to estimate relationships among variables. Specifically, it may be used to model the relationship between a dependent variable y with multiple explanatory variables (also referred to as "independent variables") that can be denoted by X. This relationship (also referred to as "model") can then be used to study how the dependent variable changes when at least one of the independent variables are varied.

As an example, assuming that there is a real estate data set that includes the size and market value of households in a county. Table 2 below shows an example of such real estate data set.

TABLE 2

| Living area (feet²) | Price (1000$s) |
|---|---|
| 2104 | 400 |
| 1600 | 330 |
| 2400 | 369 |
| 1416 | 232 |
| 3000 | 540 |
| ... | ... |

Given this training data, the goal of regression analysis is to learn a model that best describes the relationship between these variables. The learned model can then be used to predict the price of other households in the neighborhood based on their size.

Linear regression is a popular analysis tool that models the value of dependent variable y as a linear function of independent variables X. Given n independent variables (also referred to as "features" or "data attributes"), the hypothesis function $h_\theta(X)$ is given by formula (5) below:

$$h_\theta(X) = \sum_{j=1}^{n} \theta_j x_j \quad (5)$$

where $X = (x_1, x_2, \ldots x_n)$ denotes the feature vector with the first feature corresponding to a constant or 1. The goal of linear regression is to estimate the model parameters $\theta_i$ that best fit the training data. The cost function J and its partial derivative $$\frac{\partial J}{\partial \theta}$$

for linear regression are given by Equations (6) and (7) below:

$$J(\theta_0, \theta_1, \ldots, \theta_n) = \frac{1}{2m}\sum_{i=1}^{m}(h_\theta(X^{(i)}) - y^{(i)})^2 \quad (6)$$

$$\frac{\partial}{\partial \theta_j} J(\theta_0, \theta_1, \ldots, \theta_n) = \frac{1}{m}(h_\theta(X^{(i)}) - y^{(i)})X_j^{(i)} \quad (7)$$

where $\{X^{(i)}, y^{(i)}\}$ denote the ith training sample, and $X_j^{(i)}$ denotes the jth feature in $X^{(i)}$.

Classification generally refers to the analysis process of identifying to which of a set of categories a new observation belongs, on the basis of a training set of data containing observations whose category membership is known. An example would be assigning a given email into "spam" or "non-spam" classes or assigning a diagnosis to a given patient as described by observed characteristics of the patient, such as, gender, blood pressure, presence or absence of certain symptoms, etc. Classification is an example of pattern recognition.

In the terminology of machine learning, classification may be considered an instance of supervised learning, e.g., learning where a training set of correctly identified observations is available. The corresponding unsupervised procedure is known as clustering, and involves grouping data into categories based on some measure of inherent similarity or distance.

Often, the individual observations can be analyzed into a set of quantifiable properties, also referred to as "explanatory variables" or "features." These properties may variously be categorical (e.g., "A," "B," "AB," or "O" for blood type), ordinal (e.g., "large", "medium," or "small"), integer-valued (e.g., the number of occurrences of a particular word in an email) or real-valued (e.g., a measurement of blood pressure). Other classifiers may work by comparing observations to previous observations by a similarity or distance function. Thus, classification analysis is similar to regression analysis, except that the dependent variable y now belongs to a small set of discrete values.

For example, in binary classification, y can take two values, namely, 0 and 1. Logistic regression analysis may be a tool used for binary classifications, where given a data sample $X = (x_1, x_2, \ldots x_n)$, the output can be modeled using a sigmoid function as shown in Equation (8) below:

$$h_\theta(X) = \frac{1}{1 + e^{-\sum_{j=1}^{n}\theta_j x_j}} \quad (8)$$

The above function generally is bounded between 0 and 1, with $h_\theta(X)$ tending to 1 as $\theta^T X \to \infty$ and $h_\theta(X)$ tending to 0 as $\theta^T X \to -\infty$. The cost function J and its partial derivative $$\frac{\partial J}{\partial \theta}$$

for binary classification using logistic regression is given by Equations (9) and (10) below.

$$J(\theta_0, \theta_1, \ldots, \theta_n) = \quad (9)$$
$$\frac{1}{m}\sum_{i=1}^{m} (y^{(i)} \log(h_\theta(X^{(i)})) + (1 - y^{(i)})\log(1 - h_\theta(X^{(i)})))$$

$$\frac{\partial}{\partial \theta_j} J(\theta_0, \theta_1, \ldots, \theta_n) = \frac{1}{m}\sum_{i=1}^{m} (h_\theta(X^{(i)}) - y^{(i)})X_j^{(i)} \quad (10)$$

According to various examples, a secure solution may be used for optimization on multi-party data in a privacy-preserving fashion. The main observation that forms the foundation of this solution is that both the cost function and the update operation in the gradient descent technique reduce to a summation over private data.

Therefore, this summation operation may be replaced with a secure sum protocol mentioned above, thereby allowing for secure optimization on multi-party data.

First, note from Equations (3) and (4) above that both the cost function J and the partial derivative $$\frac{\partial J}{\partial \theta}$$

in the gradient descent technique are evaluated on the training data $\{X^{(i)}, y^{(i)}\}_{i=1}^{m}$. This dataset is distributed across multiple parties, e.g., the m training samples are distributed across N parties as $\{m_1, m_2, \ldots m_N\}$, where $m_i$ denotes the number of samples with party i, and $\Sigma_{i=1}^{N}=m$. Equations (3) and (4) can be rewritten as Equations (11) and (12) as follows:

$$J(\theta_0, \theta_1, \ldots, \theta_n) = \frac{1}{m}\sum_{i=1}^{N}\sum_{k=1}^{m_i} J(\theta_0, \theta_2, \ldots, \theta_n \mid \{X^{[k]}, y^{[k]}\}) \quad (11)$$

$$\frac{\partial}{\partial \theta_j} J(\theta_0, \theta_1, \ldots, \theta_n) = \quad (12)$$
$$\frac{1}{m}\sum_{i=1}^{N}\sum_{k=1}^{m_i} \frac{\partial}{\partial \theta_j} J(\theta_0, \theta_2, \ldots, \theta_n \mid \{X^{[k]}, y^{[k]}\})$$

The inner summation in each of the above Equations (11) and (12) denote computations that are based on data belonging to a single party, and thus can be completely evaluated by the party. On the other hand, the outer summation involves data across multiple parties, and thus this summation can be computed in a secure, privacy-preserving manner. Moreover, note that while the inner summation may involve complex and non-linear functions, the outer summation is simply over N scalars, each generated by a party. In other words, irrespective of the machine learning mechanism and its cost function, the outer summation generally involves a sum over N scalars, which can be computed using a secure sum protocol mentioned above.

The secure sum protocol uses an untrusted mediator and leverages collusion-resistant data anonymization to protect data privacy. This protocol is secure under the honest-but-curious model and is secure to collusion attacks, as long as there are at least two honest parties.

Table 3 below provides a privacy-preserving multi-party optimization for a generic machine learning problem with cost function J and gradient function $$\frac{\partial J}{\partial \theta}.$$

TABLE 3

1: M initializes $\{\theta_1, \theta_2, \ldots \theta_n\}$
2: M sets convergence to false
3: M sets J to ∞
4: for each gradient descent iteration until convergence is true do
5:     M sends $\{\theta_1, \theta_2, \ldots \theta_n\}$ to all parties
6:     for i = 1, ..., N do
7:         for each dimension j = 1, ..., n do
8:             Pi computes local gradient $LG_{ij}$ =

$$\sum_{k=1}^{m_i} \frac{\partial}{\partial \theta_j} J(\theta_0, \theta_1, \ldots \theta_n \mid \{X^{(k)}, y^{(k)}\})$$

9:         end for
10:        Pi computes local cost value $LJ_i$ = $\Sigma_{k=1}^{m_i} J(\theta_0, \theta_1, \ldots \theta_n \mid \{X^{(k)}, y^{(k)}\})$
11:        $P_i$ shards each element in $\{LJ_i, LG_{i1}, \ldots, LG_{in}\}$ into two segments
12:        Pi encrypts the shards $\{\{LJ_i\}_1, \{LJ_i\}_2, \{LG_{i1}\}_1, \{LG_{i1}\}_2, \ldots, \{LG_{in}\}_1, \{LG_{in}\}_2\}$ with the public keys of M, and $P_i$s in order of i = 1, ..., N
13:        Pi sends $\{E[\{LJ_i\}_1], E[\{LJ_i\}_2], E[\{LG_{i1}\}_1], E[\{LG_{i1}\}_2], \ldots, E[\{LG_{in}\}_1], E[\{LG_{in}\}_2]\}$ to the mediator M
14:     end for
15:     M receives $\{E[\{LJ_i\}_1], E[\{LJ_i\}_2], E[\{LG_{i1}\}_1], E[\{LG_{i1}\}_2], \ldots, E[\{LG_{in}\}_1], E[\{LG_{in}\}_2]\}$ from all Pi
16:     M sends the encrypted shards to party PN
17:     for i = N, N = 1, ..., 2 do
18:         Pi decrypts and shuffles the shards
19:         Pi sends the decrypted and shuffled shards to party Pi-1
20:     end for
21:     P1 decrypts and shuffles the shards
22:     P1 sends the anonymized shards to mediator M
23:     M decrypts and extracts local gradients for each dimension j = 1, ..., n
24:     M computes global gradient $G_j = \frac{1}{m}\sum_{i=1}^{N}\sum_{k=1}^{2} \{LG_{ij}\}_k$ for each dimension j = 1, ..., n
25:     for each dimension j = 1, ..., n do
26:         M updates $\theta_j = \theta_j - \alpha G_j$
27:     end for
28:     M computes Jnew = $\frac{1}{m}\sum_{i=1}^{N}\sum_{k=1}^{2} \{LJ_i\}_k$
29:     if J - Jnew ≤ ε then
30:         convergence is true
31:     end if
32: end for At the end of the proposed algorithm, each party has the final model parameters $\{\theta_0, \theta_1, \ldots, \theta_n\}$. Each party can then use the learned model to independently predict and classify any new data samples it collects.

The secure sum protocol used herein can be replaced with other protocols. However, the secure sum protocol offers better security, which is provided by allowing the participating parties to communicate in a privacy-preserving manner.

Also, although the data are sharded into two data segments in the above example for illustration purposes, the data can be shard into s segments, where s>1. Such data segmentation (or data sharding) can make the protocol robust to prior knowledge attacks. The data sharding solution can also be replaced with alternate approaches that mask the structure of the data. For example, one alternate approach could be to have the parties determine a-priori a large random number R, where each party Pi generates s random numbers $\{r_{i1}, r_{i2}, \ldots r_{is}\}$ from [−R, R] such that $\Sigma_{j=1}^{s} r_{ij} = LJ_i$. The local gradients can also be masked using a similar approach.

Moreover, the sequential process, in which each party decrypts the shards, shuffles them, and sends them to the next party, results in only one party being active at any given time, with the remaining N−1 parties being idle in their CPU cycles. To improve overall CPU usage, the gradient descent operation can be parallelized by using a different encryption order for each dimension when Pi encrypts the shards $\{\{LJ_i\}_1, \{LJ_i\}_2, \{LG_{i1}\}_1, \{LG_{i1}\}_2 \ldots, \{LG_{in}\}_1, \{LG_{in}\}_2\}$ with the public keys of M, and $P_i$s. For example, rather than encrypting all the local gradients using the same encryption order, all $\{LG_{i1}\}_1, \{LG_{i1}\}_2$ can be encrypted using the parties' public keys in order i=1, ..., N; all $\{LG_{i2}\}_1$, $\{LG_{i2}\}_2$ can be encrypted using public key order i=2, ..., N, 1; all $\{LG_{i3}\}_1$, $\{LG_{i3}\}_2$ can be encrypted using order i=3, ..., N, 1, 2, etc. Then, the mediator can invoke parallel decryption cycles by sending $E[\{LG_{i1}\}_1]$, $E[\{LG_{i1}\}_2]$ to party N first, $E[\{LG_{i2}\}_1], E[\{LG_{i2}\}_2]$ to party 1 first, $E[\{LG_{i3}\}_1], E[\{LG_{i3}\}_2]$ to party 2 first, etc. This improves the CPU utilization of all participating parties, thereby reducing the overall execution time.

Note also that although the gradient descent technique is described in details in this disclosure, the gradient descent technique can be replaced with any other variants, such as, the mini-batch gradient descent, the stochastic gradient descent, etc. As an example, in case of the mini-batch gradient descent, the parties may decide a-priori on the batch size b. Then, each party can use a random sub-sample of size b from their data (rather than the entire data) to compute the local gradient and the cost function value. Similarly, the mediator can normalize the global gradient and global cost function value using N*b rather than m.

Finally, the linear regression analysis and the logistic regression analysis are provided here as examples only. The privacy-preserving multi-party analytics mechanism disclosed herein can apply to a broad range of machine learning algorithms, including but not limited to, a ridge regression cost function, a support vector machine (SVM) function, a least absolute shrinkage and selection operator (LASSO) function, etc.

Figure 2:
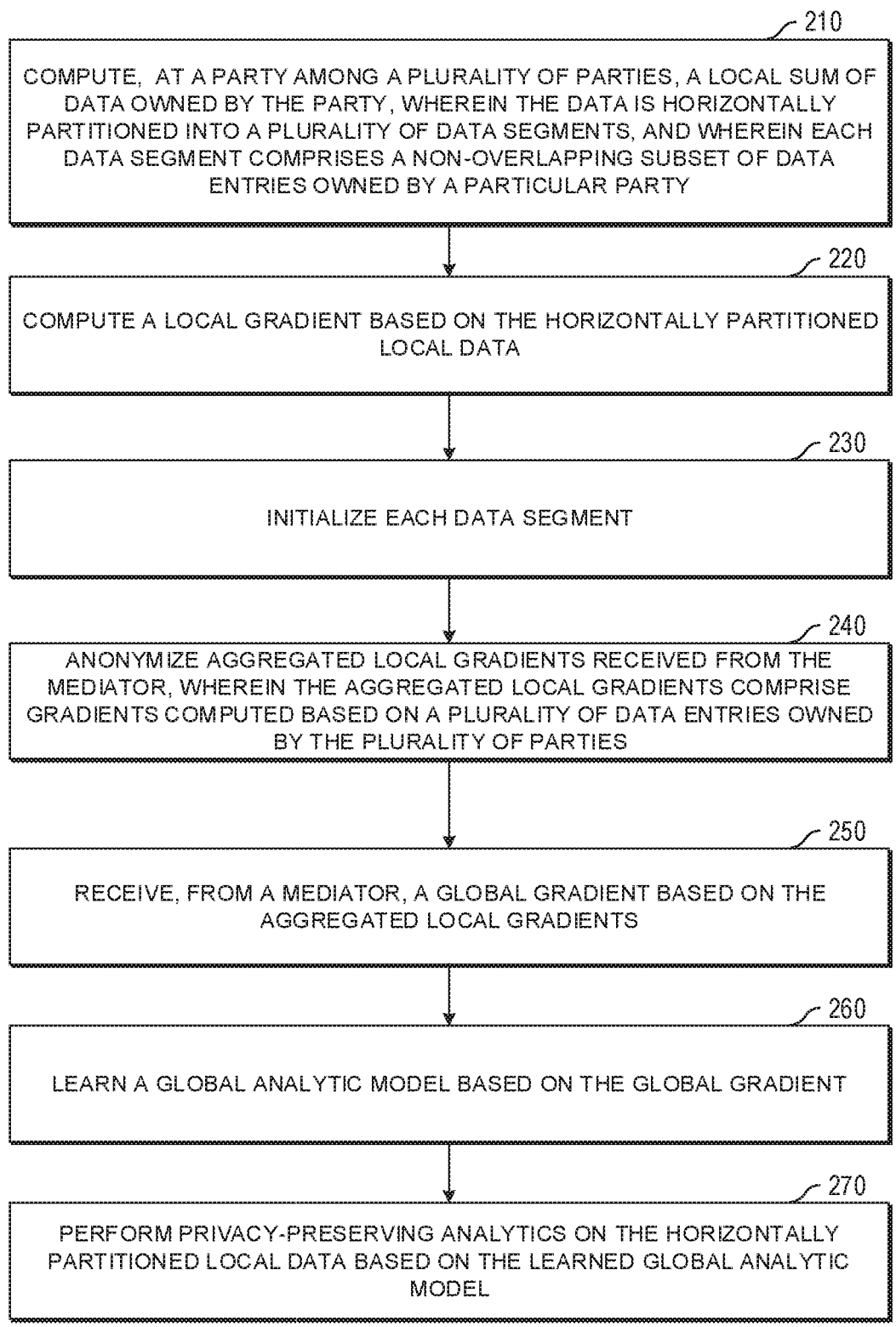
FIG. 2 is a flowchart of an example process to perform privacy-preserving multi-party analytics on horizontally partitioned local data.

FIG. 2 is a flowchart of an example process for performing privacy-preserving multi-party analytics on horizontally partitioned local data. During operations, a computing device can compute, at a party among a plurality of parties, a sum of local data owned by the party (operation 210). The local data may be horizontally partitioned into a plurality of data segments, and each data segment includes a non-overlapping subset of data entries owned by a particular party. Moreover, the computing device can compute a local gradient based on the horizontally partitioned local data (operation 220). Here, the local gradient generally refers to the degree of steepness of a graph including the horizontally partitioned local data. Furthermore, the computing device can initialize each data segment (operation 230). Next, the computing device can anonymize aggregated local gradients received from the mediator (operation 240). Here, the aggregated local gradients include gradients computed based on a plurality of data entries owned by the plurality of parties. In addition, the computing device can receive, from a mediator, a global gradient based on the aggregated local gradients (operation 250). Then, the computing device can learn a global analytic model based on the global gradient (operation 260). Finally, the computing device can perform privacy-preserving multi-party analytics on the horizontally partitioned local data based on the learned global analytic model (operation 270).

In some implementations, while initializing each data segment, the computing device can divide each data segment into at least two data shards. Then, the computing device can recursively encrypt each data shard using a plurality of public keys corresponding to the plurality of parties and the mediator. Further, the computing device can share each encrypted data shard with the mediator.

In some implementations, while anonymizing the aggregated local data, the computing device can decrypt a collection of data shards received from the mediator using the private key corresponding to the first party; shuffle the collection of data shards that are decrypted using the private key corresponding to the first party; and, transmit the shuffled collection of data shards to one of the plurality of parties and the mediator. The collection of data shards can then be further decrypted using other private keys corresponding to other parties in the plurality of parties following a predetermined priority order.

In some examples, the gradient descent function includes a first-order iterative mechanism that searches for a solution by iteratively perform a plurality of operations in the direction of negative gradient. Here, the plurality of operations may include initializing the local model parameters, and updating the local model parameters for each dimension based on a current gradient value until a termination criteria is satisfied.

In some examples, the cost function may include a linear regression cost function, a logistic regression cost function, a ridge regression cost function, a support vector machine (SVM) function, a least absolute shrinkage and selection operator (LASSO) function, etc.

In some examples, the plurality of parties participate in data sharing under a semi-honest adversary model, in which each party follows an agreed-upon protocol while attempting to acquire information about private data during computation.

Figure 3:
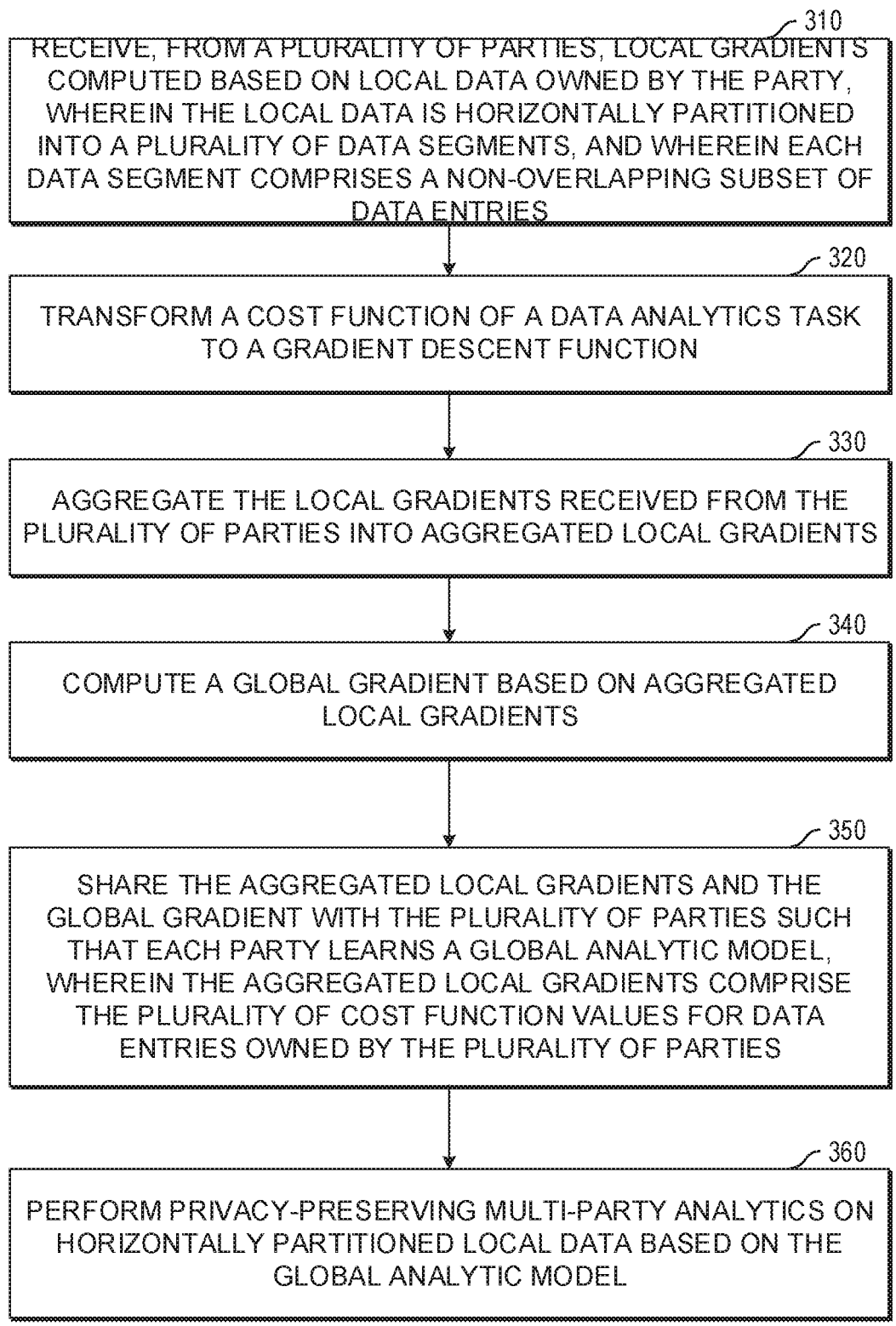
FIG. 3 is a flowchart of an example process to perform privacy-preserving multi-party analytics on horizontally partitioned local data.

FIG. 3 is a flowchart of an example process for performing privacy-preserving multi-party analytics on horizontally partitioned local data. During operations, a computing device may receive, from a plurality of parties, local gradients computed based on local data owned by the party, wherein the local data is horizontally partitioned into a plurality of data segments, and wherein each data segment comprises a non-overlapping subset of data entries (operation 310). Then, the computing device can transform a cost function of a data analytics task to a gradient descent function (operation 320). Further, the computing device can aggregate the local gradients received from the plurality of parties into aggregated local gradients (operation 330). Also, the computing device can compute a global gradient based on aggregated local gradients (operation 340). Moreover, the computing device can share the aggregated local gradients and the global gradient with the plurality of parties such that each party learns a global analytic model (operation 350). Here, the aggregated local gradients may include the plurality of cost function values for data entries owned by the plurality of parties. Finally, the computing device can perform privacy-preserving multi-party analytics on horizontally partitioned local data based on the global analytic model (operation 360).

The present disclosure may be embedded in a non-transitory computer-readable storage medium (e.g., a programmable circuit; a semiconductor memory such as a volatile memory such as random access memory "RAM," or non-volatile memory, such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a special purpose computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

A special purpose computer may also be used to perform these operations that solve the issues with data privacy rooted in computer technology given the ease with which data is stored, transported, and retrieved. The present disclosure makes improvements to the working of the computer itself by implementing these operations. Thus, the disclosed features are advances in the field of distributed secure data sharing using a non-trusted mediator.

Figure 4:
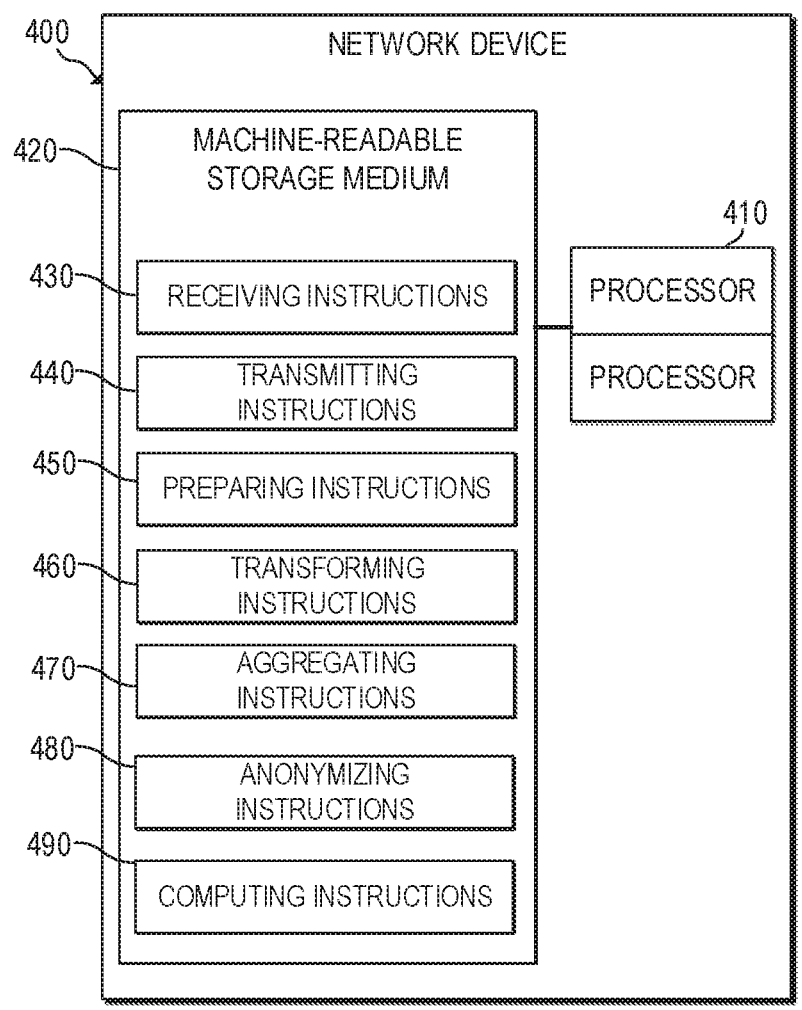
FIG. 4 is a block diagram of an example network device for performing privacy-preserving multi-party analytics on horizontally partitioned data.

FIG. 4 is an example block diagram of a special purpose computer for performing privacy-preserving multi-party analytics on horizontally partitioned local data. Special purpose computer 400 is a network device that generally includes a device suitable for performing privacy-preserving multi-party analytics on horizontally partitioned local data. As illustrated in FIG. 4, network device 400 may include one or more processors 410 and a machine-readable storage medium 420.

Processor 410 may be one or more central processing units (CPUs), CPU cores, semiconductor-based microprocessors, and/or other hardware devices suitable for retrieval and execution of instructions stored in machine-readable storage medium 420. Processor 410 may fetch, decode, and execute one or more of receiving instructions 430, transmitting instructions 440, preparing instructions 450, transforming instructions 460, aggregating instructions 470, anonymizing instructions 480, and computing instructions 490 to control the process for performing privacy-preserving multi-party analytics on horizontally partitioned local data. As an alternative or in addition to retrieving and executing instructions, processor 910 may include one or more electronic circuits that include electronic components for performing the functionality of one or more of instructions 430-490.

Machine-readable storage medium 420 in network device 400 may include only a subset of instructions 430-490, depending on the role of network device 400 in the distributed system. For example, the distributed system may include two kinds of devices, e.g., parties and the non-trusted mediator. Network device 400 acting as the non-trusted mediator may not include preparing instructions 450 for preparing a data set. It may include aggregating instructions 470 for aggregating the received data set. On the other hand, network device 400 acting as a party may include preparing instructions 450. Moreover, computing instructions 490 may instruct processors 410 to perform different operations. For example, when network device 400 acts as a non-trusted mediator, computing instructions 490 may instruct processors 410 to calculate a global sum. However, when network device 400 acts as a party, computing instructions 490 may instruct processors 410 to perform local statistics computations. Therefore, the set of instructions on network devices disclosed herein may be different depending on whether an entity takes the role of a party or a mediator. In some implementations, the set of instructions can be the same on all network devices when an entity can act as both a party and a mediator.

Machine-readable storage medium 420 may be any electronic, magnetic, optical, or other physical storage device that contains or stores executable instructions. Thus, machine-readable storage medium 420 may be, for example, Random Access Memory (RAM), an Electrically Erasable Programmable Read-Only Memory (EEPROM), a storage device, an optical disc, and the like. In some implementations, machine-readable storage medium 420 may be a non-transitory storage medium, where the term "non-transitory" does not encompass transitory propagating signals.

As described in details below, non-transitory machine-readable storage medium 420 may be encoded with a series of executable instructions 430-490 to: compute, at a party among a plurality of parties, a sum of local data owned by the party, wherein the data is horizontally partitioned into a plurality of data segments, and wherein each data segment comprises a non-overlapping subset of data entries owned by a particular party; transform a cost function of a data analytics task to a gradient descent function; initialize each data segment; divide each data segment into at least two data shards; recursively encrypt each data shard using a plurality of public keys corresponding to the plurality of parties and the mediator; share each encrypted data shard with the mediator; anonymize aggregated local gradients received from the mediator, wherein the aggregated local gradients comprise gradients computed based on a plurality of data entries owned by the plurality of parties; decrypt a collection of data shards received from the mediator using the private key corresponding to the first party; shuffle the collection of data shards that are decrypted using the private key corresponding to the first party; transmit the shuffled collection of data shards to one of the plurality of parties and the mediator; receive, from a mediator, a global gradient based on the aggregated local gradients; update, at a party, local model parameters based on the global gradient; learn a global analytic model based on the global gradient; perform privacy-preserving multi-party analytics on the horizontally partitioned local data based on the learned global analytic model; etc.

Also, non-transitory machine-readable storage medium 420 may be encoded with a series of executable instructions 430-490 further to: receive, from a plurality of parties, local gradients of data owned by the party, wherein the data is horizontally partitioned into a plurality of data segments, and wherein each data segment comprises a non-overlapping subset of data entries; aggregate the local gradients received from the plurality of parties into aggregated local gradients; compute a global gradient based on aggregated local gradients; share the aggregated local gradients and the global gradient with the plurality of parties such that each party learns a global analytic model, wherein the aggregated local gradients comprise the plurality of cost function values for data entries owned by the plurality of parties; compute a global gradient that preserves data privacy of the plurality of parties in a multi-party environment based on the local model parameters and the plurality of cost function values; perform privacy-preserving multi-party analytics on horizontally partitioned local data based on the global analytic model; etc.

The foregoing disclosure describes a number of example implementations for performing privacy-preserving multi-party analytics on horizontally partitioned local data. As detailed above, example implementations provide an intuitive, discoverable mechanism for performing privacy-preserving analytics across multiple parties in a multi-party environment. Additional implementations and advantages of such implementations will be apparent to those of skill in the art upon reading and understanding the foregoing description.

We claim:

1. A method comprising:
computing, by a computing device at a party among a plurality of parties, a sum of local data owned by the party, wherein the local data is horizontally partitioned into a plurality of data segments, and wherein each data segment comprises a non-overlapping subset of data entries owned by a particular party;
computing, by the computing device, a local gradient based on the horizontally partitioned local data;
initializing, by the computing device, each data segment by:
dividing each data segment into at least two data shards;
recursively encrypting each data shard using a plurality of public keys corresponding to the plurality of parties and the mediator; and
sharing each encrypted data shard with the mediator;
receiving, by the computing device, an aggregated local gradient from a mediator, wherein the mediator computes the aggregated local gradients based on a plurality of data entries in the each initialized data segment owned by the plurality of parties;
anonymizing, by the computing device, the aggregated local gradient received from the mediator;
receiving, by the computing device from the mediator, a global gradient based on the anonymized aggregated local gradients;
learning, by the computing device, a global analytic model based on the global gradient; and
performing, by the computing device, privacy-preserving multi-party analytics on the horizontally partitioned local data based on the learned global analytic model.

2. The method of claim 1, wherein computing the local gradient based on the horizontally partitioned local data uses a gradient descent function to search for a solution by iteratively performing a plurality of operations in a direction of negative gradient.

3. The method of claim 2, wherein the plurality of operations comprise initializing local model parameters, and iteratively updating the local model parameters for each dimension based on a current gradient value until a termination criteria is satisfied, wherein the local model parameters are adapted to the global analytic model upon the termination criteria being satisfied.

4. The method of claim 1, wherein the cost function comprises one of: a linear regression cost function, a logistic regression cost function, a ridge regression cost function, a support vector machine (SVM) function, and a least absolute shrinkage and selection operator (LASSO) function.

5. The method of claim 1, wherein the plurality of parties participate in data sharing under a semi-honest adversary model in which each party follows an agreed-upon protocol while attempting to acquire information about private data during computation.

6. The method of claim 1, wherein anonymizing the aggregated local data further comprises:
decrypting, by the computing device, a collection of data shards received from the mediator using the private key corresponding to the first party;
shuffling, by the computing device, the collection of data shards that are decrypted using the private key corresponding to the first party; and
transmitting, by the computing device, the shuffled collection of data shards to one of the plurality of parties and the mediator.

7. The method of claim 6, wherein the collection of data shards is further decrypted using other private keys corresponding to other parties in the plurality of parties following a predetermined priority order.

8. A system comprising:
a plurality of computing devices associated with a plurality of parties participating in privacy-preserving data sharing under a semi-honest adversary model, and
a mediator coupled to the plurality of parties;
wherein each of the plurality of computing devices comprises a hardware processor to:
transform a cost function of a data analytics task to a gradient descent function;
compute a local gradient of local data owned by a particular party based on the cost function, wherein the local data is horizontally partitioned into a plurality of data segments, and wherein each data segment comprises a non-overlapping subset of data entries owned by the particular party;
initialize each data segment by:
dividing each data segment into at least two data shards;
recursively encrypting each data shard using a plurality of public keys corresponding to the plurality of parties and the mediator; and
sharing each encrypted data shard with the mediator;
receive an aggregated local gradient from a mediator, wherein the mediator computes the aggregated local gradients based on a plurality of data entries in the each initialized data segment;
anonymize the aggregated local gradient received from the mediator;
receive from a mediator a global gradient computed based on the anonymized aggregated local gradients;
learn a global analytic model based on the global gradient; and
wherein the mediator computes a global gradient used in the global analytic model to perform privacy-preserving multi-party analytics on the horizontally partitioned local data.

9. The system of claim 8, wherein the gradient descent function searches for a solution by iteratively performing a plurality of operations in a direction of negative gradient.

10. The system of claim 9, wherein the plurality of operations comprise initializing the local model parameters, and iteratively updating the local model parameters for each dimension based on a current gradient value until a termination criteria is satisfied, wherein the local model parameters are adapted to the global analytic model upon the termination criteria being satisfied.

11. The system of claim 8, wherein the plurality of parties participate in data sharing under a semi-honest adversary model in which each party follows an agreed-upon protocol while attempting to acquire information about private data during computation.

12. The system of claim 8, wherein the hardware processor in each of the plurality of computing devices is further to:
decrypt a collection of data shards received from the mediator using the private key corresponding to a first party;

shuffle the collection of data shards that are decrypted using the private key corresponding to the first party; and transmit the shuffled collection of data shards to one of the plurality of parties and the mediator.

13. The system of claim 12, wherein the collection of data shards is further decrypted using other private keys corresponding to other parties in the plurality of parties following a predetermined priority order.

14. The system of claim 8, wherein the cost function comprises one of: a linear regression cost function, a logistic regression cost function, a ridge regression cost function, a support vector machine (SVM) function, and a least absolute shrinkage and selection operator (LASSO) function.

15. A non-transitory machine-readable storage medium encoded with instructions executable by at least one processor of a computing device associated with a mediator in a multi-party environment, the machine-readable storage medium comprising instructions to:

receive, from a plurality of parties, local gradients computed based on local data owned by the party, wherein the local data is horizontally partitioned into a plurality of data segments, and wherein each data segment comprises a non-overlapping subset of data entries;

divide each data segment into at least two data shards;

recursively encrypt each data shard using a plurality of public keys corresponding to the plurality of parties and the mediator;

share each encrypted data shard with the mediator;

transform a cost function of a data analytics task to a gradient descent function based on the received local gradients;

aggregate the local gradients received from the plurality of parties into aggregated local gradients;

compute a global gradient based on the aggregated local gradients;

share the aggregated local gradients and the global gradient with the plurality of parties wherein each party learns a global analytic model, wherein the aggregated local gradients comprise a plurality of cost function values for data entries owned by the plurality of parties; and perform privacy-preserving multi-party analytics on horizontally partitioned local data based on the global analytic model.

16. The non-transitory machine-readable storage medium of claim 15, wherein the gradient descent function searches for a solution by iteratively performing a plurality of operations in a direction of negative gradient.

17. The non-transitory machine-readable storage medium of claim 16, wherein the plurality of operations comprise initializing the local model parameters, and updating the local model parameters for each dimension based on a current gradient value until a termination criteria is satisfied.

18. The non-transitory machine-readable storage medium of claim 15, wherein the cost function comprises one of a linear regression cost function, a logistic regression cost function, a ridge regression cost function, a support vector machine (SVM) function, and a least absolute shrinkage and selection operator (LASSO) function.

* * * * *